US011956161B2

(12) United States Patent
Harmatos et al.

(10) Patent No.: US 11,956,161 B2
(45) Date of Patent: Apr. 9, 2024

(54) TECHNIQUE FOR DETERMINING A PACKET DELAY BUDGET

(71) Applicant: Telefonaktiebolaget LM Ericsson (publ), Stockholm (SE)

(72) Inventors: János Harmatos, Budapest (HU); Sándor Rácz, Cegléd (HU); Geza Szabo, Kecskemét (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 77 days.

(21) Appl. No.: 17/625,529

(22) PCT Filed: Jul. 10, 2019

(86) PCT No.: PCT/EP2019/068582
§ 371 (c)(1),
(2) Date: Jan. 7, 2022

(87) PCT Pub. No.: WO2021/004630
PCT Pub. Date: Jan. 14, 2021

(65) Prior Publication Data
US 2022/0272046 A1     Aug. 25, 2022

(51) Int. Cl.
*H04L 47/56* (2022.01)
*H04L 43/0852* (2022.01)
*H04L 43/106* (2022.01)

(52) U.S. Cl.
CPC .......... *H04L 47/56* (2013.01); *H04L 43/0852* (2013.01); *H04L 43/106* (2013.01)

(58) Field of Classification Search
CPC ... H04L 47/56; H04L 43/0852; H04L 43/106; H04L 41/5019; H04L 43/0864
See application file for complete search history.

(56) References Cited

U.S. PATENT DOCUMENTS 7,626,975 B2 * 12/2009 Colban ............... H04L 12/1881
                                                             370/510
8,199,665 B2 *  6/2012 Won .................... H04L 43/0852
                                                             370/252
(Continued)

FOREIGN PATENT DOCUMENTS

| CN | 102609317 A | 7/2012 |
| WO | 2014160709 A2 | 10/2014 |
| WO | WO 2020035148 A1 | 2/2020 |

OTHER PUBLICATIONS

International Search Report and Written Opinion of the International Searching Authority, PCT/EP2019/068582, dated Mar. 2, 2020, 19 pages.

(Continued)

*Primary Examiner* — Kibrom T Hailu
(74) *Attorney, Agent, or Firm* — Sage Patent Group

(57) ABSTRACT

A technique for determining an available delay budget for transmission of a packet by a base station to a user equipment, UE, in a cellular network is disclosed. A method implementation of the technique is performed by the base station and includes receiving a packet from a sending node, the packet including a timestamp set by the sending node when processing the packet, triggering determining a latency of the packet based on a difference between a time determined by the base station upon receipt of the packet and the timestamp set by the sending node in the packet, the base station and the sending node being synchronized in time, and triggering determining an available delay budget for transmission of the packet to the UE based on the latency of the packet.

20 Claims, 8 Drawing Sheets

(56) References Cited

U.S. PATENT DOCUMENTS

| | | | |
|---|---|---|---|
| 2006/0268713 A1 | 11/2006 | Lundstrom | |
| 2011/0128856 A1 | 6/2011 | Won et al. | |
| 2011/0199262 A1* | 8/2011 | Karaoguz | G01S 19/36 |
| | | | 342/357.64 |
| 2013/0028166 A1* | 1/2013 | Watanabe | H04W 72/30 |
| | | | 370/312 |
| 2014/0105044 A1 | 4/2014 | Baillargeon | |
| 2015/0078171 A1* | 3/2015 | Gai | H04W 28/0268 |
| | | | 370/237 |
| 2015/0154814 A1* | 6/2015 | Kalinadhabhotla | G07C 5/008 |
| | | | 701/31.5 |
| 2015/0257024 A1 | 9/2015 | Baid et al. | |
| 2015/0358376 A1* | 12/2015 | Fan | H04N 21/2662 |
| | | | 709/219 |

OTHER PUBLICATIONS

ETSI GS NGP 008 v0.0.3 (Jun. 2018), Next Generation Protocols (NGP); Mobile Deterministic Networking, Group Specification, 22 pages.

3GPP TR 23.725 v1.1.0 (Oct. 2018), 3rd Generation Partnership Project; Technical Specification Group Services and System Aspects; Study on enhancement of Ultra-Reliable Low-Latency Communication (URLLC) support in the 5G Core network (5GC) (Release 16), 67 pages.

Indian Examination Report dated Sep. 12, 2022 for Indian Patent Application No. 202117050887, 5 pages.

* cited by examiner

TECHNIQUE FOR DETERMINING A PACKET DELAY BUDGET

CROSS REFERENCE TO RELATED APPLICATIONS

This application is a 35 U.S.C. § 371 national stage application of PCT International Application No. PCT/EP2019/068582 filed on Jul. 10, 2019, the disclosure and content of which is incorporated by reference herein in its entirety.

TECHNICAL FIELD

The present disclosure generally relates to cellular networks. In particular, a technique for determining an available delay budget for transmission of a packet by a base station to a user equipment (UE) in a cellular network is provided. The technique may be embodied in methods, computer programs, apparatuses and systems.

BACKGROUND 5G mobile communication systems are generally designed to support ultra-reliable low-latency communication (URLLC) and, for the efficient support of URLLC services, it may not only be important to achieve low latency in general, it may even be more critical to ensure a bound (i.e., an upper limit) on the latency, e.g., to ensure that a particular packet arrives at the destination within a given time limit. In 3GPP terminology, such upper limit is referred to as a packet delay budget (PDB) defining a upper delay limit for the processing and transmission of each packet by the core network (CN) and the radio access network (RAN) to the UE.

The latency limit is typically important for cyclical communication services, such as industry automation processes (e.g., factory automation, robotized assembly lines, printing, packaging machines, laser cutting, etc.) or other mission-critical services (e.g., drone control, automotive control, etc.), for example. The fulfillment of the latency limit is critical when the services are unable to tolerate delayed packets, e.g., when a few delayed packets cause service degradation or even collapse. In PROFINET, one of the most widespread industry automation protocols, for example, if three delayed packets are detected, safety stop mechanisms are activated immediately to avoid damage of physical devices. Proper PDB management is therefore crucial to ensure correct service operation. If the PDB cannot be guaranteed, service reliability and availability may decrease and serious safety problems may occur.

FIG. 1 illustrates a simplified view of the latency components of a 5G system in an exemplary control scenario. A control packet transmitted by a controller application may travel through a wire-bound data network (DN) and arrive at the 5G system via the N6 interface. The packet may then be processed by one or more user plane functions (UPFs) acting as gateways of the 5G system and forwarding the packet to a next generation NodeB (gNB), i.e., a base station, which processes and schedules the packet for transmission via the air interface towards a UE executing an application to be controlled. As indicated in the figure, two main latency components are given: (1) latency$_{UPF\_gNB}$ comprising the processing and scheduling/queuing delay caused by the UPF(s) as well as the transmission latency from the UPF(s) to the gNB, and (2) latency$_{gNB\_UE}$ comprising the processing delay (e.g., including the time required to compile radio frames) and the scheduling delay caused by the gNB as well as the delay caused by the radio transmission of the packet to the UE, e.g., the delay caused by the framing structure on the radio by the transmission time interval (TTI), which may be 1 ms in 4G systems or which may be on the 100 μs scale in 5G systems, for example.

From the PDB management point of view, the critical part is the delay on the segment between the gNB and the UE which may be of high variance due to the wireless nature of the segment and scheduling aspects regarding the UE, for example. Considering the PDB defined (or "prescribed") for a given packet flow and the latency$_{UPF\_gNB}$ (hereinafter also referred to as the "CN tunnel latency"), the available delay budget for the gNB processing and radio transmission of a packet to the UE can be calculated by the gNB using the formula PDB$_{gNB\_UE}$=PDB−latency$_{UPF\_gNB}$, for example. In 5G systems, however, there is currently no mechanism for guaranteeing a tight PDB for URLLC services, especially when multiple URLLC services having a tight PDB compete for the radio resources.

A current solution for PDB management discussed in 3GPP is illustrated in FIG. 2. According to this solution, the CN tunnel latency between the UPF(s) and the gNB is periodically measured by a monitoring function operated by the session management function (SMF) of the network. The measured CN tunnel latency value is forwarded by the SMF to the gNB which stores the latency value and, based on the value, the gNB derives the time available for processing and radio transmission of a packet so that radio frame scheduling can be managed accordingly. If a change of the CN tunnel latency is detected (e.g., due to a change of network load, failures, etc.), the SMF updates the gNB with the new CN tunnel latency value.

This process may suffer from the following problems. In the monitoring process, the one-way latency is calculated using the round-trip delay between the GNB and the UPF(s), which may be problematic as the uplink and downlink latency is often not symmetric so that the calculated CN tunnel latency may be incorrect. Also, the calculated CN tunnel latency is calculated as an average value assuming that the value is constant. If the latency changes packet-wise, however, the actually stored CN tunnel latency may not be valid for every packet and, due to false latency information for a particular packet, the PDB may not be kept for every packet. Furthermore, the update process of the CN tunnel latency may generally be slow. The monitoring function first needs to detect the changed CN tunnel latency and the SMF needs to update the gNB, which then calculates the available time budget using the new latency value. Since, in case of most URLLC services, the service cycle time is very small (e.g., on ms scale), however, it may happen that some consecutive packets are delayed as network conditions have already changed but the gNB is not yet updated, so that the gNB may calculate the available time budget based on an outdated CN tunnel latency value, potentially resulting in a violation of the PDB. Moreover, it may happen that a packet arrives earlier than the currently stored CN tunnel latency value, in which case the packet could be scheduled later without any service degradation and other (delayed) packets could be scheduled earlier. However, if the gNB schedules the packets based on the outdated CN tunnel latency, such kind of "reactive" scheduling is generally not possible.

SUMMARY

Accordingly, there is a need for a technique for determining an available delay budget for transmission of a packet to a UE which avoids one or more of the problems discussed above, or other problems.

According to a first aspect, a method for determining an available delay budget for transmission of a packet by a base station to a UE in a cellular network is provided. The method is performed by the base station and comprises receiving a packet from a sending node, the packet including a timestamp set by the sending node when processing the packet, triggering determining a latency of the packet based on a difference between a time determined by the base station upon receipt of the packet and the timestamp set by the sending node in the packet, the base station and the sending node being synchronized in time, and triggering determining an available delay budget for transmission of the packet to the UE based on the latency of the packet.

The method may further comprise triggering scheduling the packet for transmission to the UE based on the determined available delay budget. The packet may be transmitted as part of a packet flow, wherein the available delay budget may be determined based on a difference between a PDB allowable for packets of the packet flow and the latency of the packet. The base station may be informed about the PDB allowable for packets of the packet flow by a management node of the cellular network. Not every packet of the packet flow may include a timestamp set by the sending node.

The sending node may be a gateway node of the cellular network. In particular, the gateway node may be an ingress gateway of the cellular network. Alternatively, the sending node may be an originating node of the packet external to the cellular network. The timestamp set by the sending node may be included in an extension header of the packet. The packet may also include an indication of an uplink latency observed between the base station and the sending node. The method may in this case further comprise receiving an uplink packet from the UE, triggering setting a timestamp in the uplink packet when processing the uplink packet, the timestamp in the uplink packet enabling the sending node to determine the uplink latency between the base station and the sending node based on a difference between a time determined by the sending node upon receipt of the uplink packet and the timestamp set by the base station in the uplink packet, and triggering sending the uplink packet to the sending node.

According to a second aspect, a method for supporting determination of an available delay budget for transmission of a packet by a base station to a UE in a cellular network is provided. The method is performed by a sending node and comprises triggering setting a timestamp in a packet to be transmitted to the UE via the base station when processing the packet, the timestamp enabling the base station to determine an available delay budget for transmission of the packet to the UE based on a latency of the packet, the latency of the packet to be determined based on a difference between a time determined by the base station upon receipt of the packet and the timestamp set by the sending node in the packet, the base station and the sending node being synchronized in time, and triggering sending the packet to the base station for transmission to the UE.

The method according to the second aspect defines a method from the perspective of a sending node which may be complementary to the method performed by the base station according to the first aspect. The sending node and the base station of the second aspect may thus correspond to the sending node and the base station described above in relation to the first aspect.

As in the method of the first aspect, the packet may be transmitted as part of a packet flow, wherein the timestamp set by the sending node in the packet may enable the base station to determine the available delay budget based on a difference between a PDB allowable for packets of the packet flow and the latency of the packet. The sending node may be instructed by a management node of the cellular network to set timestamps in packets of the packet flow when processing the packets. Not every packet of the packet flow may include a timestamp set by the sending node.

The sending node may be a gateway node of the cellular network. In particular, the gateway node may be an ingress gateway of the cellular network. The method may in this case further comprise receiving, prior to setting the timestamp in the packet, the packet from an originating node of the packet external to the cellular network. The packet may be transmitted as part of a cyclic communication carried out between the UE and the originating node, wherein the timestamp set by the sending node in the packet may be adjusted to reflect a delay variance observed between the sending node and the originating node with respect to an expected cycle time of the cyclic communication. The expected cycle time may be calculated based on a cycle length of the cyclic communication, wherein the sending node may be informed about the cycle length by a management node of the cellular network. The timestamp set by the sending node in the packet may be conditionally adjusted to reflect the delay variance when the delay variance exceeds a predetermined threshold.

Alternatively, the sending node may be an originating node of the packet external to the cellular network. The timestamp set by the sending node may be included in an extension header of the packet. The packet may also include an indication of an uplink latency observed between the base station and the sending node. The method may in this case further comprise receiving an uplink packet from the base station, the uplink packet including a timestamp set by the base station when processing the packet, and triggering determining the uplink latency between the base station and the sending node based on a difference between a time determined by the sending node upon receipt of the uplink packet and the timestamp set by the base station in the uplink packet.

According to a third aspect, a computer program product is provided. The computer program product comprises program code portions for performing the method of at least one of the first aspect and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a base station for determining an available delay budget for transmission of a packet by the base station to a UE in a cellular network is provided. The base station comprises at least one processor and at least one memory, wherein the at least one memory contains instructions executable by the at least one processor such that the base station is operable to perform any of the method steps presented herein with respect to the first aspect.

According to a fifth aspect, a sending node for supporting determination of an available delay budget for transmission of a packet by a base station to a UE in a cellular network is provided. The sending node comprises at least one processor and at least one memory, wherein the at least one memory contains instructions executable by the at least one processor such that the sending node is operable to perform any of the method steps presented herein with respect to the second aspect.

According to a sixth aspect, there is provided a system comprising a base station according to the fourth aspect and a sending node according to the fifth aspect.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 3A:
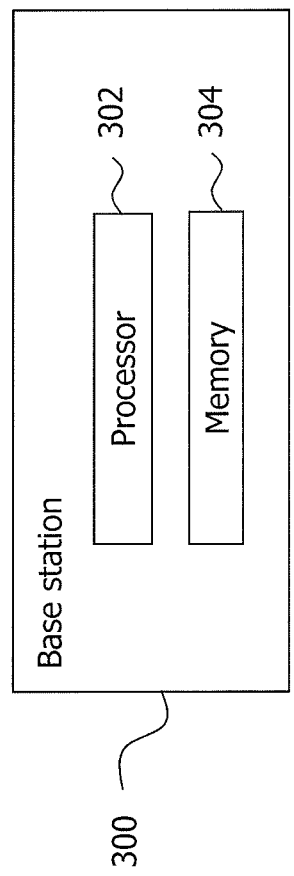
FIGS. 3a and 3b illustrate exemplary compositions of a base station and a sending node according to the present disclosure.

FIG. 3a schematically illustrates an exemplary composition of a base station 300 for determining an available delay budget for transmission of a packet by the base station 300 to a UE in a cellular network. The base station 300 comprises at least one processor 302 and at least one memory 304, wherein the at least one memory 304 contains instructions executable by the at least one processor 302 such that the base station is operable to carry out the method steps described herein below with reference to the base station.

Figure 3B:
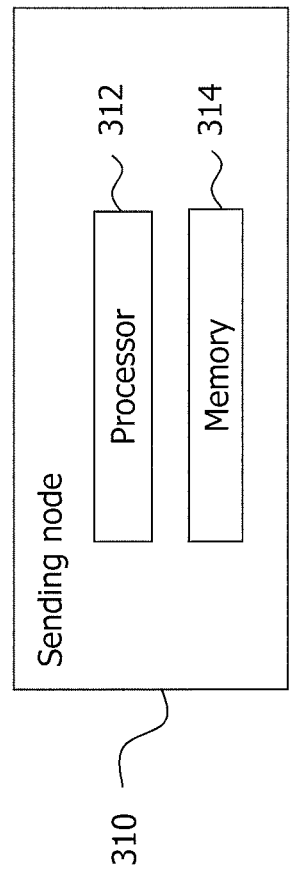

FIG. 3b schematically illustrates an exemplary composition of a sending node 310 for supporting determination of an available delay budget for transmission of a packet by a base station to a UE in a cellular network. The sending node 310 comprises at least one processor 312 and at least one memory 314, wherein the at least one memory 314 contains instructions executable by the at least one processor 312 such that the sending node 310 is operable to carry out the method steps described herein below with reference to the sending node.

It will be understood that each of the base station 300 and the sending node 310 may be implemented on a physical computing unit or a virtualized computing unit, such as a virtual machine, for example. It will further be appreciated that each of the base station 300 and the sending node 310 may not necessarily be implemented on a standalone computing unit, but may be implemented as components—realized in software and/or hardware—residing on multiple distributed computing units as well, such as in a cloud computing environment, for example.

Figure 4:
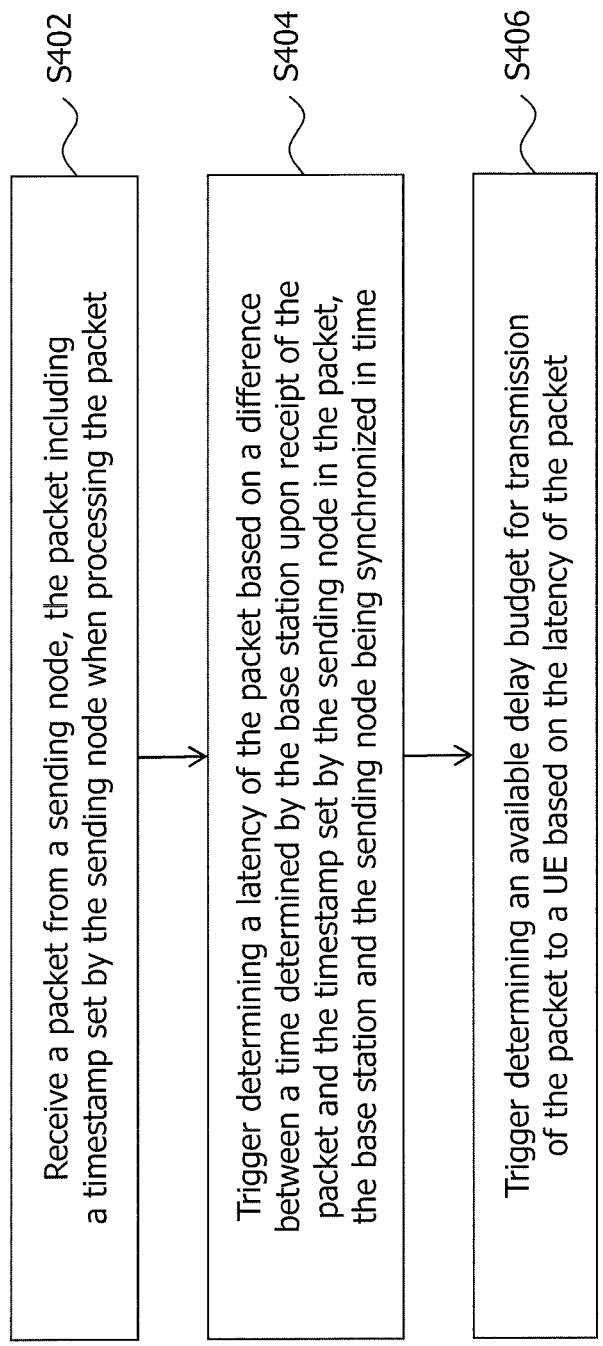
FIG. 4 illustrates a method which may be performed by the base station according to the present disclosure.

FIG. 4 illustrates a method which may be performed by the base station 300 according to the present disclosure. The method is dedicated to determining an available delay budget for transmission of a packet by the base station 300 to a UE in a cellular network. In step S402, the base station 300 may receive a packet from a sending node (e.g. the sending node 310), the packet including a timestamp set by the sending node when processing the packet. In step S404, the base station 300 may trigger determining a latency of the packet based on a difference between a time determined by the base station 300 upon receipt of the packet and the timestamp set by the sending node in the packet, the base station 300 and the sending node being synchronized in time. In step S406, the base station 300 may trigger determining an available delay budget for transmission of the packet to the UE based on the latency of the packet.

The sending node may thus set a timestamp (denoted hereinafter as $t_{SN}$) obtained from its local clock when processing the packet (e.g., when the packet arrives at the sending node from an originating node or when the packet is generated by the sending node) and forward the packet towards the base station 300 for further delivery to the UE. Upon arrival of the packet at the base station 300, the base station 300 may obtain a timestamp (denoted hereinafter as $t_{BS}$) from its local clock and, as the base station 300 and sending node are synchronized in time, the base station 300 may determine the latency of the packet based on calculating the difference between the two timestamps. The latency of the packet may generally refer to the time required for processing and scheduling the packet at the sending node as well as for transmission of the packet from the sending node to the base station 300. This latency will hereinafter be denoted as $\text{latency}_{SN\_BS}$ and may be calculated as $\text{latency}_{SN\_BS} = t_{BS} - t_{SN}$, for example. By applying per packet timestamping in this manner, rather than calculating an averaged CN tunnel latency value as in known PDB management solutions, as described above, the available delay budget may be determined based on the actual (e.g., real-time) latency of each packet and, as such, the available delay budget may provide a more accurate basis for scheduling the packet for transmission to the UE.

The base station 300 may trigger scheduling the packet for transmission to the UE based on the determined available delay budget, e.g., in order to ensure that a PDB defined (or "prescribed") for the packet is complied with and the packet is thus transmitted to the UE on time (i.e., within the time limit set by the PDB). A scheduler of the base station 300 may prioritize packets having a lower available delay budget over packets having a relatively higher available delay budget, e.g., to achieve that delayed packets are scheduled with a higher priority such that they may keep their PDB, while non-delayed packets arriving at the base station 300 may be scheduled with less priority so that they may be transmitted at a later point of time that still keeps their PDB. For the scheduler of the base station 300, the available delay budget may represent an additional parameter that is considered in the scheduling decision, i.e., besides other common factors, such as the radio channel quality or scheduling policies, for example.

The available delay budget may correspond to a time left for processing (e.g., including the time required to compile a radio frame as well as the scheduling delay at the base station 300) and radio transmission of the packet to the UE to keep the PDB defined for the packet, such as a PDB generally defined for packets of a particular packet flow. The PDB may correspond to an upper delay limit allowable for transmission of packets of the packet flow to the UE. The packet may as such be transmitted as part of a packet flow, wherein the available delay budget may be determined based on a difference between a PDB allowable for packets of the packet flow and the latency of the packet. In one variant, the available delay budget $PDB_{BS\_UE}$ for transmission of the packet to the UE may be calculated as $PDB_{BS\_UE}=PDB-latency_{SN\_BS}$.

The base station 300 may be informed about the PDB allowable for packets of the packet flow by a management node of the cellular network, such as by an SMF in case of a 5G system, for example. The management node itself, in turn, may be informed about the PDB by an originating node of the packet, such as a control application external to the cellular network which uses a (e.g., cyclical) communication service, as part of which the packet is transmitted. The PDB may be case-specific and may thus be defined differently depending on the use case. The communication service may be a URLLC service, for example. The cellular network may be a 5G network, for example, in which case the base station 300 may be a gNB. It will be understood, however, that the technique presented herein may be used with other networks and services as well.

As said, to be able to precisely determine the latency of the packet based on the difference between the timestamp $t_{SN}$ set by the sending node when processing the packet and the time $t_{BS}$ determined by the base station 300 upon receipt of the packet in accordance with step S404, the base station 300 and the sending node may be time synchronized. The clocks of the base station 300 and the sending node may be synchronized using known time synchronization techniques, such as using the Precision Time Protocol (PTP) defined by the IEEE 1588 standard, for example. Since clocks of base stations are typically synchronized due to the radio transmission requirements to be complied with, the clock of the base station 300 may be used as time reference for the sending node when carrying out time synchronization. It will be understood that other techniques to implement time synchronization may be employed, such as GPS based solutions, for example.

As the base station 300 may have limited computational resources, it may generally be desired to avoid overloading the base station 300 by computations required for determining the available delay budget and to thereby avoid adding unexpected latency or packet loss at the side of the base station 300. To this end, not every packet of the packet flow may include a timestamp set by the sending node. In particular, when a stable latency between the sending node and the base station 300 may be assumed, it may be acceptable that a timestamp set by the sending node is not included in all packets (e.g., of a packet flow) sent by the sending node to the base station 300, but only every nth packet (where n=2, 3, . . . ), for example. In such a case, the base station 300 may store the last calculated available delay budget $PDB_{BS\_UE}$ and apply this value for scheduling subsequently arriving packets (e.g., of the same packet flow) until the next packet with a timestamp set by the sending node arrives.

In one implementation, the sending node may be a gateway node of the cellular network, such as a UPF of a 5G network, for example. If multiple gateway nodes (e.g., UPFs) are used in the cellular network, the gateway node may be an ingress gateway of the cellular network. When, in such a case, the packet is transported through other gateways on the transmission path to the base station 300, these other gateways may not modify the timestamp set by the sending node and just copy it transparently to the respectively outgoing frames, for example.

While it will be understood that the timestamp set by the sending node may generally be included in any field of the packet, in one particular variant, the timestamp set by the sending node may be included in an extension header of the packet. For example, if the sending node is a gateway of the cellular network and the packet is forwarded to the base station using the General Packet Radio Service (GPRS) Tunneling Protocol User Plane (GTP-U) protocol, the timestamp set by the sending node may be included in a GTP-U extension header of the packet. If the sending node is an originating node of the packet, on the other hand, the timestamp set by the sending node may be included in a transport Internet Protocol (IP) extension header, for example.

Figure 1:
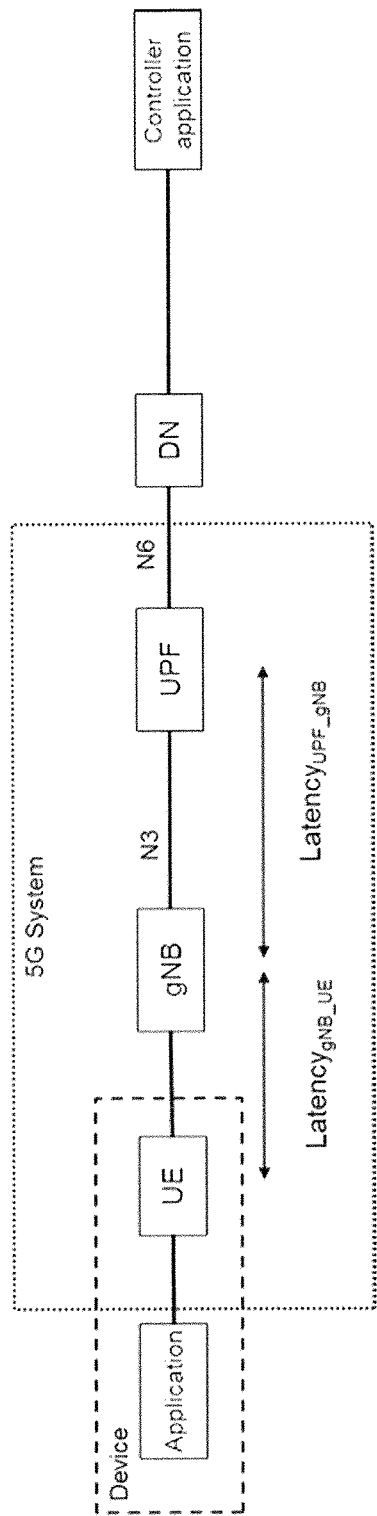
FIG. 1 illustrates a simplified view of the latency components of a 5G system.
Figure 2:
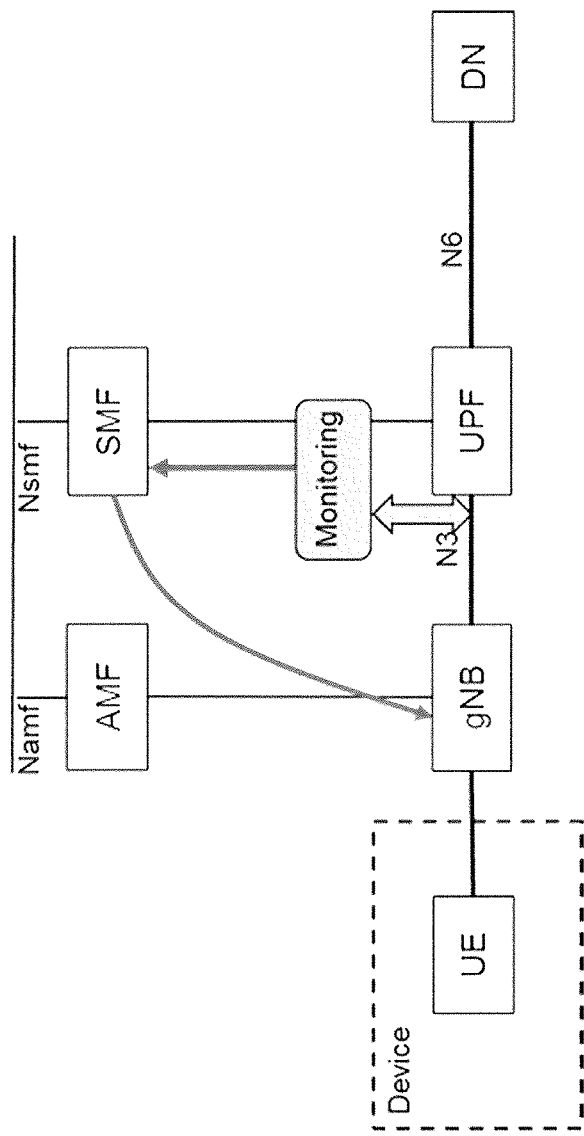
FIG. 2 illustrates a solution for PDB management discussed in 3GPP.
Figure 5:
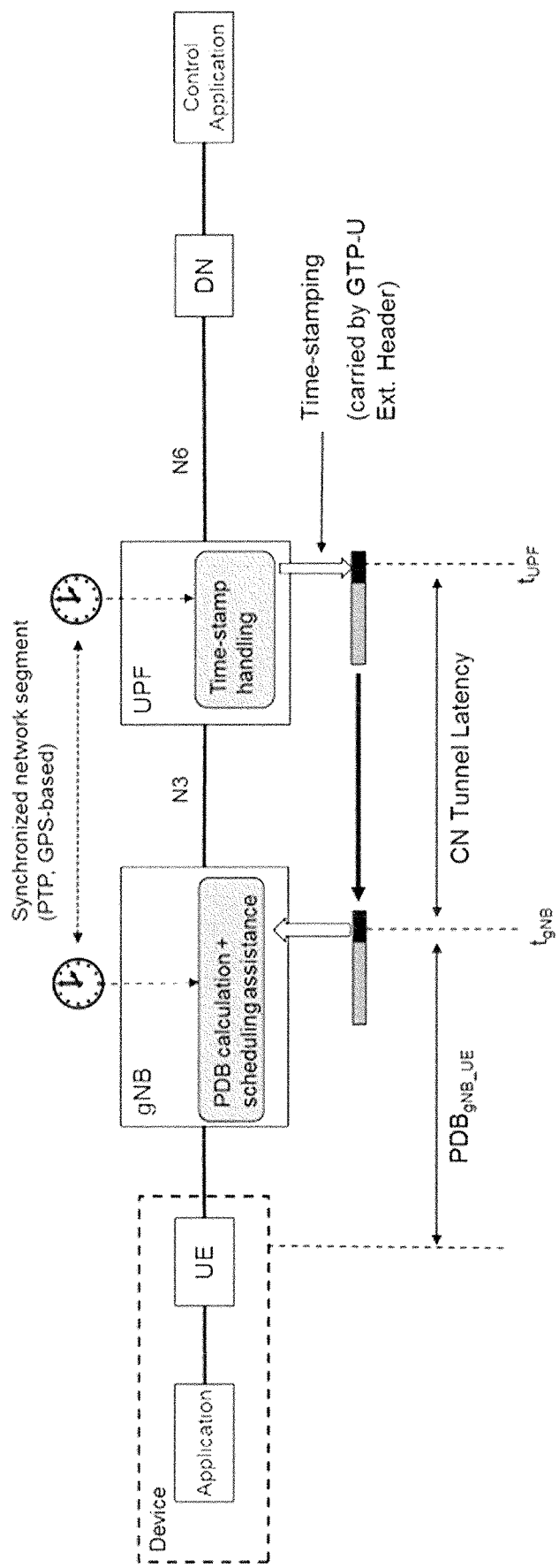
FIG. 5 illustrates an exemplary implementation in accordance with the present disclosure, wherein the sending node is a gateway node.

FIG. 5 illustrates an exemplary implementation of the technique presented herein in a 5G based control scenario, such as the one described above in relation to FIG. 1, wherein the sending node is an (ingress) gateway node of the cellular network. More specifically, in the shown example, the gateway node is a UPF supporting a timestamp handling function for related URLLC flows. The base station is a gNB supporting a PDB calculation function for the given URLLC flows. An SMF of the network (not shown) may inform the gNB about the prescribed PDB of the involved flows for use by the PDB calculation function. Both the timestamp handling function and the PDB calculation function may be initiated by the SMF, for example.

When a packet belonging to a certain flow and destined to the UE arrives from the control application (i.e., the originating node of the packet) at the UPF via the DN, the timestamp handling function of the UPF may obtain the time of packet arrival $t_{UPF}$ from the local clock of the UPF. When the UPF has processed the packet and the outgoing frame is assembled, the timestamp handling function may set the timestamp $t_{UPF}$ in a GTP-U extension header of the packet in order to have the obtained time information carried on the user plane path through the CN when the packet is transmitted to the gNB. In case of multiple UPFs (not shown) deployed in the network on the path to the gNB, only the ingress UPF may be responsible for the above processing and the other UPFs may not process the time information, other than transparently copying it to the GTP-U extension header of the respectively outgoing frames. When the packet arrives at the gNB, the PDB calculation function of the gNB may determine the arrival time $t_{gNB}$ of the packet using the local clock of the gNB, which is synchronized with the clock of the UPF, and calculate the available delay budget for transmission of the packet to the UE as $PDB_{gNB\_UE}=PDB-(t_{gNB}-t_{UPF})$, wherein $t_{gNB}-t_{UPF}$ represents the CN tunnel latency, i.e., $latency_{UPF\_gNB}$. A scheduling assistance function of the gNB may then cause the scheduler of the gNB to take into account the calculated $PDB_{gNB\_UE}$ value as an additional parameter for the scheduling so that the gNB schedules the packet for transmission based on the calculated $PDB_{gNB\_UE}$, e.g., in order to ensure that the PDB defined for the packet is complied with and the packet is transmitted to the UE on time, as described above.

Figure 6:
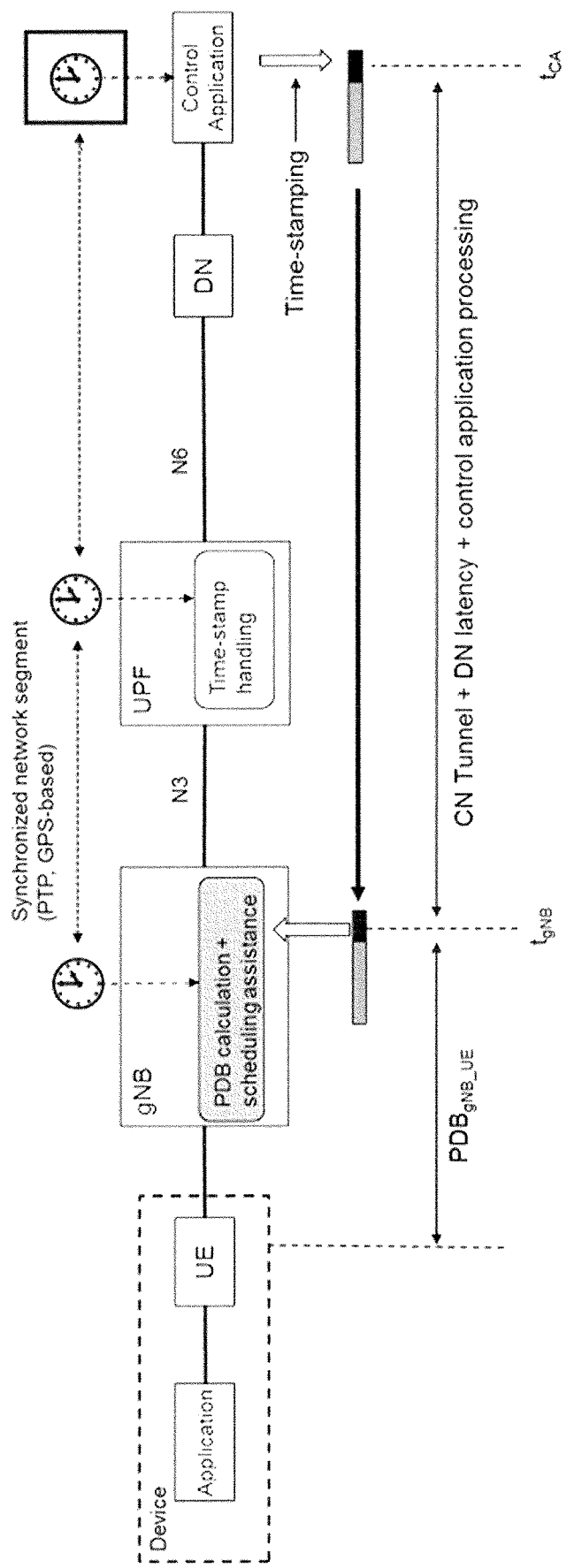
FIG. 6 illustrates an exemplary implementation in accordance with the present disclosure, wherein the sending node is an originating node of the packet.

FIG. 6 illustrates another exemplary implementation of the technique presented herein, which differs from the example of FIG. 5 in that the sending node is not the UPF, but an originating node of the packet external to the cellular network, i.e., the control application of the control scenario. In such an implementation, PDB management may be extended to take into consideration the end-to-end PDB, wherein the delay caused by the DN and the processing delay at the control application may be considered for the PDB calculation as well. Such extension may be applied to both cyclic or acyclic URLLC communication. As shown in the figure, time synchronization may extend in this case to the control application and the timestamp set by the sending node may correspond to a timestamp $t_{CA}$ obtained from the local clock at the control application. The control application may set the timestamp $t_{CA}$ in an IP extension header of the packet, for example, and the UPF timestamp handling function of the UPF may copy the timestamp to the GTP-U extension header for further delivery to the gNB through the CN. The timestamp handling function of the UPF and the PDB calculation function of the gNB may be informed about the end-to-end PDB by the SMF which, in turn, may obtain the end-to-end PDB from the control application, e.g., via a dedicated Application Programming Interface (API) provided by the 5G system, for example. Upon arrival of the packet at the gNB, the PDB calculation function of the gNB may calculate the available delay budget $PDB_{gNB\_UE}$ in the same manner as described above in relation to FIG. 5.

The above-described control scenarios relate to calculating the available delay budget $PDB_{BS\_UE}$ for downlink traffic. It will be understood, however, that similar considerations may also be made for uplink traffic. The packet may thus also include an indication of an uplink latency observed between the base station and the sending node. In order to determine the uplink latency, the method may further comprise receiving an uplink packet from the UE, triggering setting a timestamp in the uplink packet when processing the uplink packet, the timestamp in the uplink packet enabling the sending node to determine the uplink latency between the base station and the sending node based on a difference between a time determined by the sending node upon receipt of the uplink packet and the timestamp set by the base station in the uplink packet, and triggering sending the uplink packet to the sending node. The sending node may thus determine the uplink latency between the base station and the sending node based on the difference between the time determined by the sending node upon receipt of the uplink packet and the timestamp set by the base station in the uplink packet. When the next downlink packet is to be transmitted from the sending node to the base station, the sending node may set the determined uplink latency in the packet so that, upon receipt of the packet, the base station may take the uplink latency information included in the packet into consideration for scheduling uplink communication from the UE.

Figure 7:
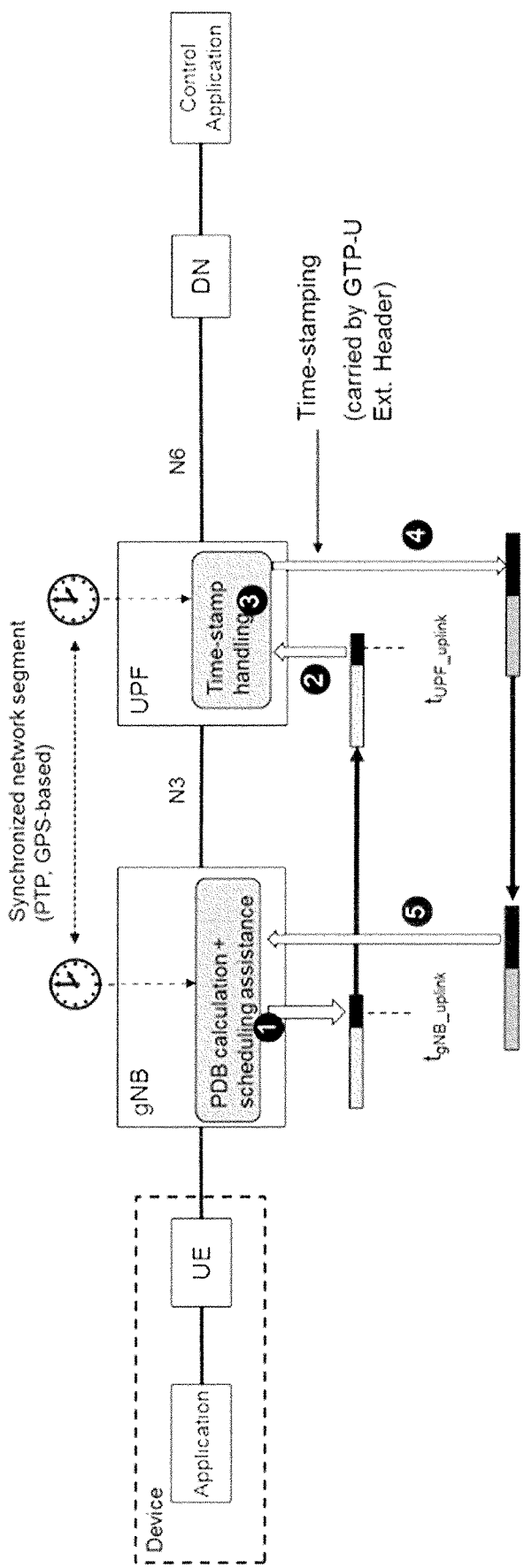
FIG. 7 illustrates an exemplary implementation for determining an uplink latency according to the present disclosure.

FIG. 7 illustrates an exemplary implementation of such technique in the control based scenario of FIG. 5. As shown in the figure, in step 1, the PDB calculation function may obtain a timestamp $t_{gNB\_uplink}$ using the local clock of gNB when the UE is scheduled and receives an uplink packet (e.g., of a particular flow) and add this timestamp to the uplink packet. In step 2, when the uplink packet arrives at the UPF, the timestamp handling function of the UPF may obtain a timestamp $t_{UPF\_uplink}$ using the local clock of the UPF. In step 3, the timestamp handling function of the UPF may calculate the uplink CN tunnel latency as $t_{UPF\_uplink} - t_{gNB\_uplink}$ and store the calculated latency value for later use. When the next downlink packet (e.g., of the same flow) arrives at the UPF from the control application, the timestamp handling function of the UPF may add, in step 4, the calculated uplink tunnel latency into the GTP-U extension header of the downlink packet, e.g., in addition to timestamp $t_{UPF}$ used for the downlink PDB management described above. In step 5, upon receipt of the downlink packet, the gNB may consider the uplink latency value included in the downlink packet when the UE is scheduled for uplink communication.

Figure 8:
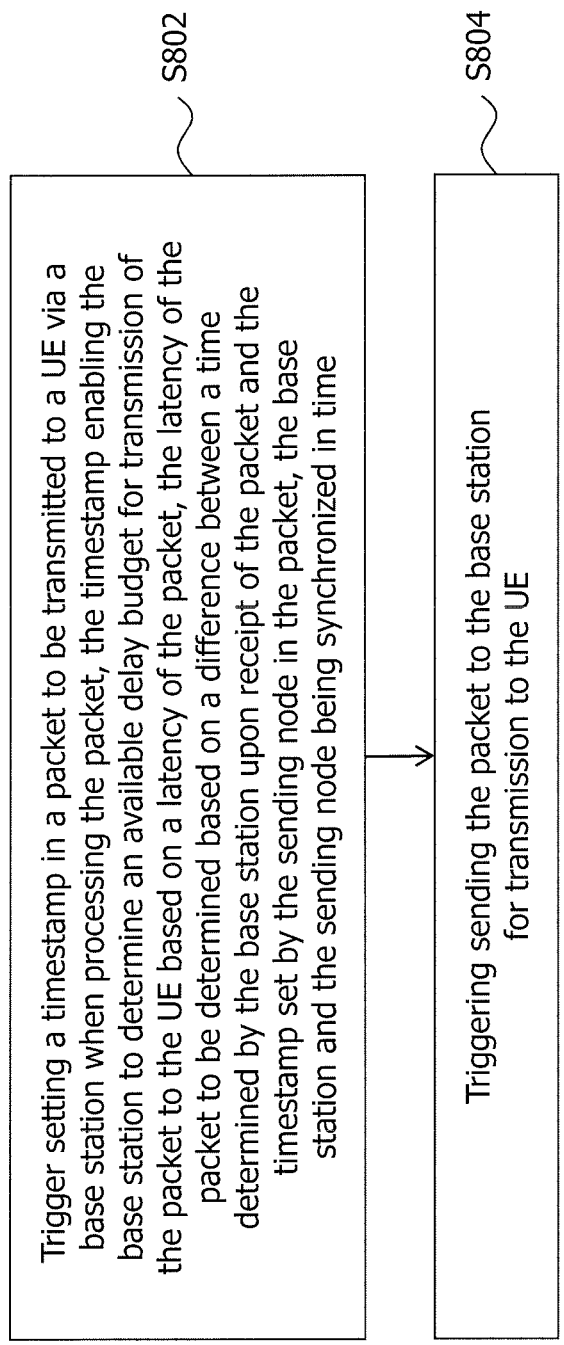
FIG. 8 illustrates a method which may be performed by the sending node according to the present disclosure.

FIG. 8 illustrates a method which may be performed by the sending node 310 according to the present disclosure. The method is dedicated to supporting determination of an available delay budget for transmission of a packet by a base station (e.g., the base station 300) to a UE in a cellular network. The operation of the sending node 310 may be complementary to the operation of the base station 300 described above and, as such, aspects described above with regard to the operation of the sending node may be applicable to the operation of the sending node 310 described in the following as well, and vice versa. Unnecessary repetitions are thus omitted in the following.

In step S802, the sending node 310 may trigger setting a timestamp in a packet to be transmitted to the UE via the base station when processing the packet, the timestamp enabling the base station to determine an available delay budget for transmission of the packet to the UE based on a latency of the packet, the latency of the packet to be determined based on a difference between a time determined by the base station upon receipt of the packet and the timestamp set by the sending node 310 in the packet, the base station and the sending node 310 being synchronized in time. In step S804, the sending node 310 may trigger sending the packet to the base station for transmission to the UE.

As described above in relation to FIG. 4, the packet may be transmitted as part of a packet flow, wherein the timestamp set by the sending node 310 in the packet may enable the base station to determine the available delay budget based on a difference between a PDB allowable for packets of the packet flow and the latency of the packet. The sending node 310 may be instructed by a management node of the cellular network to set timestamps in packets of the packet flow when processing the packets. Not every packet of the packet flow may include a timestamp set by the sending node 310.

In one variant, the sending node 310 may be a gateway node of the cellular network, wherein the gateway node may be an ingress gateway of the cellular network. The method may in this case further comprise receiving, prior to setting the timestamp in the packet, the packet from an originating node of the packet external to the cellular network. In one particular such variant, since URLLC services typically apply cyclic communication (e.g., for factory automation, robot control, smart grids services, or the like), the method may additionally make use of cyclic communication characteristics to determine a tolerable delay variance of the communication cycle, e.g., in order to make the method more robust against jitter occurring on the segment between the originating node and the gateway (e.g., the DN). As such, the packet may be transmitted as part of a cyclic communication carried out between the UE and the originating node, wherein the timestamp set by the sending node 310 in the packet may be adjusted to reflect a delay variance observed between the sending node 310 and the originating node with respect to an expected cycle time of the cyclic communication. The sending node 310 (i.e., the gateway) may be informed about the length of the communication cycle (denoted hereinafter as $t_{cycle}$) by a management node of the cellular network, such as an SMF, which, in turn, may be informed about the communication cycle length via an API from the originating node, such as a control application, for example. The expected cycle time may thus be calculated based on a cycle length of the cyclic communication, wherein the sending node 310 may be informed about the cycle length by a management node of the cellular network. The sending node 310 may store different $t_{cycle}$ values for different packet flows and the involved UEs, for example.

To support cyclic communication, a reference cycle start time $t_{SN\_ref}$ may be determined by the sending node 310 (i.e., the gateway). For example, the reference cycle start time may be determined from the first N packets received from the originating node. When the first packet belonging to a given flow arrives at the sending node 310, $t_{UPF}$ may be stored as $t_{UPF\_0}$ and the reference cycle start time may then be calculated as $t_{SN\_ref}=\max(t_{UPF\_n}-t_{UPF\_0}+i*t_{cycle})$, where i=0, . . . , N. Once the reference cycle start time is determined, it may be used to calculate a modified timestamp $t'_{UPF}$ to be set as timestamp by the sending node 310 in a packet to be delivered to the UE. In particular, if $t_{UPF}>t_{UPF\_ref}+n*t_{cycle}$ (which means that the packet is delayed on the segment between the originating node and the gateway, resulting in a decreased available delay budget $PDB_{BS\_UE}$), the modified timestamp $t'_{UPF}$ may be calculated as $t'_{UPF}=t_{UPF}-(t_{UPF\_ref}-n*t_{cycle})$, which emulates an additional CN tunnel latency so that $PDB_{BS\_UE}$ will be smaller and the packet may be prioritized for scheduling at the base station. On the other hand, if $t_{UPF}<t_{UPF\_ref}+n*t_{cycle}$ (which means that the packet has arrived earlier as expected at the sending node 310, resulting in an increased $PDB_{BS\_UE}$), the modified timestamp $t_{UPF}$ may be calculated as $t_{UPF}=t_{UPF}+(n*t_{cycle}-t_{UPF\_ref})$, which emulates a decreased CN tunnel latency so that $PDB_{BS\_UE}$ will be larger and the packet may be treated with less priority by the scheduler of the base station.

In a refinement of the above variant, the timestamp set by the sending node in the packet may be conditionally (e.g., only) adjusted to reflect the delay variance when the delay variance exceeds a predetermined threshold, e.g., taking into consideration that some delay variance of the communication cycle may be tolerable. As such, if $t_{UPF\_ref}+n*t_{cycle}-\delta \leq t_{UPF} < t_{UPF\_ref}+n*t_{cycle}+\delta$, where $\delta$ corresponds to the predetermined threshold, the above-described (non-modified) timestamp $t_{UPF}$ may be set by the sending node 310 in the packet and, otherwise, the modified timestamp $t'_{UPF}$ may be set.

As described above in relation to FIG. 4, in another variant, the sending node 310 may be an originating node of the packet external to the cellular network. The timestamp set by the sending node 310 may be included in an extension header of the packet. The packet may also include an indication of an uplink latency observed between the base station and the sending node 310. The method may in this case further comprise receiving an uplink packet from the base station, the uplink packet including a timestamp set by the base station when processing the packet, and triggering determining the uplink latency between the base station and the sending node 310 based on a difference between a time determined by the sending node 310 upon receipt of the uplink packet and the timestamp set by the base station in the uplink packet.

As has become apparent from the above, the present disclosure provides a technique for determining an available delay budget for transmission of a packet by a base station to a UE in a cellular network. By applying per packet timestamping, wherein the actual (e.g., real-time) CN tunnel latency may be calculated for each packet, a time optimized operation for PDB management may be achieved. The proposed technique may enable proper packet-by-packet delay measurement over a cellular network infrastructure, wherein the base station may exactly know what part of the total PDB is already used by each packet when it arrives at the base station. Using this information, the base station may optimize the scheduling of the packets to guarantee that (if possible) all of them are served within their PDB. As such, support of PDB-aware scheduling of URLLC flows over radio may be provided.

External monitoring of the CN tunnel latency, as described above for known solutions for PDB management, may thus no longer be needed. The packets may contain all required information for the calculation of the available delay budget $PDB_{BS\_UE}$ and the involvement of an SMF or other control plane entities may not be required in the monitoring process. Using the proposed technique, the base station may immediately react to changes of the CN tunnel latency and there may be no need to wait for an update regarding the CN tunnel latency by the SMF, as it may be the case in known solutions. Since always up-to-date $PDB_{BS\_UE}$ values may thus be available for each flow, the base station may optimize the scheduling of the served UEs based on the available values and may thus manage (if possible, considering all available radio resources) that the packets of each service flow can be served within the PDB of each flow. As a result, the technique may support a fair handling of competing URLLC flows that share a common radio resource pool. Any impact on latency (e.g., additional delay on the transport network due to a malfunction) may immediately be considered and negative effects may be compensated by appropriate scheduling, to thereby ensure proper operation of URLLC services.

The cost of adding and/or manipulating timestamp fields in the transmitted packets may be comparable to the costs of any other functions that manipulate protocol layers and, as such, the processing of the timestamps may only need limited resources, requiring few additions with fixed point arithmetic and thereby having a benefit of well calculable CPU cycle times. Since industrial applications may generally not be bandwidth heavy, but rather delay sensitive, this may be a reasonable trade-off to translate extra bandwidth into more predictable delays in communication.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for determining an available delay budget for transmission of a packet by a base station to a user equipment, UE, in a cellular network, the method being performed by the base station and comprising:

receiving a packet from a sending node, the packet including a timestamp set by the sending node when processing the packet, wherein the sending node is an originating node of the packet external to the cellular network;

triggering determining a latency of the packet based on a difference between a time determined by the base station upon receipt of the packet and the timestamp set by the sending node in the packet, the base station and the sending node being synchronized in time; and triggering determining an available delay budget for transmission of the packet to the UE based on the latency of the packet.

2. The method of claim 1, further comprising:
triggering scheduling the packet for transmission to the UE based on the determined available delay budget.

3. The method of claim 1, wherein the packet is transmitted as part of a packet flow and wherein the available delay budget is determined based on a difference between a packet delay budget, PDB, allowable for packets of the packet flow and the latency of the packet.

4. The method of claim 3, wherein the base station is informed about the PDB allowable for packets of the packet flow by a management node of the cellular network.

5. The method of claim 3, wherein not every packet of the packet flow includes a timestamp set by the sending node.

6. The method of claim 1, wherein the sending node is a gateway node of the cellular network.

7. The method of claim 1, wherein the timestamp set by the sending node is included in an extension header of the packet.

8. A method for supporting determination of an available delay budget for transmission of a packet by a base station to a user equipment, UE, in a cellular network, the method being performed by a sending node and comprising:

triggering setting a timestamp in a packet to be transmitted to the UE via the base station when processing the packet, the timestamp enabling the base station to determine an available delay budget for transmission of the packet to the UE based on a latency of the packet, the latency of the packet to be determined based on a difference between a time determined by the base station upon receipt of the packet and the timestamp set by the sending node in the packet, the base station and the sending node being synchronized in time, wherein the sending node is an originating node of the packet external to the cellular network; and triggering sending the packet to the base station for transmission to the UE.

9. The method of claim 8, wherein the packet is transmitted as part of a packet flow and wherein the timestamp set by the sending node in the packet enables the base station to determine the available delay budget based on a difference between a packet delay budget, PDB, allowable for packets of the packet flow and the latency of the packet.

10. The method of claim 9, wherein the sending node is instructed by a management node of the cellular network to set timestamps in packets of the packet flow when processing the packets.

11. The method of claim 9, wherein not every packet of the packet flow includes a timestamp set by the sending node.

12. The method of claim 8, wherein the sending node is a gateway node of the cellular network.

13. The method of claim 12, wherein the gateway node is an ingress gateway of the cellular network.

14. The method of claim 12, further comprising:
receiving, prior to setting the timestamp in the packet, the packet from an originating node of the packet external to the cellular network, wherein the packet is transmitted as part of a cyclic communication carried out between the UE and the originating node and wherein the timestamp set by the sending node in the packet is adjusted to reflect a delay variance observed between the sending node and the originating node with respect to an expected cycle time of the cyclic communication.

15. The method of claim 14, wherein the expected cycle time is calculated based on a cycle length of the cyclic communication and wherein the sending node is informed about the cycle length by a management node of the cellular network.

16. The method of claim 14, wherein the timestamp set by the sending node in the packet is conditionally adjusted to reflect the delay variance when the delay variance exceeds a predetermined threshold.

17. The method of claim 8, wherein the timestamp set by the sending node is included in an extension header of the packet.

18. A computer program product comprising a non-transitory computer readable storage medium that comprises program code portions for performing the method of claim 1 when the computer program product is executed on one or more computing devices.

19. A base station for determining an available delay budget for transmission of a packet by the base station to a user equipment, UE, in a cellular network, the base station comprising at least one processor and at least one memory, the at least one memory containing instructions executable by the at least one processor such that the base station is operable to perform the method of claim 1.

20. A sending node for supporting determination of an available delay budget for transmission of a packet by a base station to a user equipment, UE, in a cellular network, the sending node comprising at least one processor and at least one memory, the at least one memory containing instructions executable by the at least one processor such that the sending node is operable to perform the method of claim 8.

* * * * *